United States Patent [19]

Vicard

[11] Patent Number: 5,607,596
[45] Date of Patent: Mar. 4, 1997

[54] PROCESSES FOR THE TREATMENT OF COMBUSTION RESIDUES AND FOR THE PURIFICATION OF COMBUSTION FUMES

[75] Inventor: Jean-Francois Vicard, Lyons, France

[73] Assignee: Lab S.A., Lyons, France

[21] Appl. No.: 403,925

[22] PCT Filed: Oct. 13, 1993

[86] PCT No.: PCT/FR93/01010

§ 371 Date: Mar. 22, 1995

§ 102(e) Date: Mar. 22, 1995

[87] PCT Pub. No.: WO94/08699

PCT Pub. Date: Apr. 28, 1994

[30] Foreign Application Priority Data

Oct. 15, 1992 [FR] France .................................. 92 12622

[51] Int. Cl.$^6$ ........................... B01D 37/00; B01D 53/34
[52] U.S. Cl. ........................ 210/739; 210/744; 210/754; 210/765; 210/768; 210/770; 210/783; 210/784; 210/805; 210/912; 134/10; 134/13; 134/28; 134/34; 43/1; 159/47.3; 95/64
[58] Field of Search ..................... 210/710, 712, 210/738, 744, 752, 754, 765, 768, 770, 805, 912, 739, 783, 784; 134/10, 13, 28, 34; 43/1; 159/47.1, 47.3; 95/64

[56] References Cited

U.S. PATENT DOCUMENTS

| | | |
|---|---|---|
| 4,000,991 | 1/1977 | Melin, Jr. et al. . |
| 4,389,306 | 6/1983 | Nakanishi et al. ................ 210/713 |
| 5,045,115 | 9/1991 | Gmunder et al. ................ 210/912 |
| 5,092,930 | 3/1992 | Fujisawa et al. ................ 210/728 |
| 5,403,496 | 4/1995 | Kramer et al. ................... 210/912 |

Primary Examiner—Robert J. Popovics
Attorney, Agent, or Firm—Dowell & Dowell

[57] ABSTRACT

Process for the treatment of the combustion residues and for the purification of the combustion fumes, in which the residues are washed and then rinsed to reduce the leachable fraction both in respect of the trace elements and in respect of the total soluble fraction, with a low consumption of water and of optional reactants.

10 Claims, 2 Drawing Sheets

5,607,596

PROCESSES FOR THE TREATMENT OF COMBUSTION RESIDUES AND FOR THE PURIFICATION OF COMBUSTION FUMES

BACKGROUND OF THE INVENTION

1. Field of Invention

The present invention relates to processes for burning and/or combustion of solid and/or liquid fuels and more particularly to the treatment of the solid residues generated by such processes in the form of cinders and fly ash.

2. State of the Art

When, for example, household garbage is burnt, approximately 250 kg of cinders and 25 kg of fly ash, which is entrained in the exhaust gases, are generated per metric ton. In other combustion processes the quantity of residues depends on the fuel employed and the proportion of cinders/fly ash depends on the type of combustion. Experience shows that the cinders, although quasi-vitrified, are more or less coated with soluble compounds, for example chlorides and alkaline materials which are soluble in the case of the burning of household garbage. Quenching of the cinders in a cinder pit is intended merely to cool these cinders but not to wash them; in most cases this amounts to adding water to the cinder pit, to compensate for the evaporation and the residual moisture of the cinders. In very rare cases it has been possible to employ a high water flow rate to wash the cinders; the latter have then exhibited good qualities for reclaiming. Furthermore, in household garbage incineration plants it is known to use known processes for removing metal scrap from the cinders and to crush/screen them to give them a particle size making them potentially suitable for reclaiming as highway foundation material or as material for construction. For this reclaiming to be really possible there must be no significant release of soluble components in the presence of water. Good performance is therefore necessary in a leaching test. Utilization of the known washing processes would make this possible, but this would involve a high water consumption.

Fly ash very often also includes a high proportion—which may reach 30%—of easily soluble compounds, including heavy metals. It must therefore be treated before it can be stored definitively in a dump or be reclaimed. Various processes have been proposed for such a treatment. For example, in the case of incineration plants, an electrostatic precipitator is frequently found downstream of the incineration furnace and the recovery boiler, ensuring the trapping of the fly ash followed by a wet purification ensuring the scavenging of the acidic gases, HCl and HF in particular. It has been proposed to employ the acidic purge from such wet purification for treating the fly ash by leaching in an acidic phase. The disadvantage of such a method—besides the introduction of a complex external plant—is the use of a liquid that is rich in solubilized heavy metals and in trace elements scavenged in the wet purification. It is then impossible to obtain good leaching properties of the treated residue, in particular with regard to the total soluble fraction, without high water consumption.

It has also been proposed to introduce this fly ash into the recycled scrubber liquid ensuring the scavenging of the acidic gases. In this method there is no need to introduce a complex external plant but, bearing in mind the characteristics of the scrubbing liquid, it is also impossible to obtain good leaching properties of the treated residue, in particular with regard to the total soluble fraction, without high water consumption.

SUMMARY OF THE INVENTION

The present invention is aimed at eliminating the disadvantages of the known methods and at judiciously employing a small quantity of water and/or of reactants and more particularly at judiciously employing the make-up water needed for the operation of the wet purification of the combustion fumes when the residues originate from a combustion plant equipped with wet purification of the exhaust gas. To do this, the residues to be treated are placed in contact with a washing liquid in an agitated tank and then conveyed in the form of laden liquid towards a dehydration device. Thus washed and filtered, the residues are then rinsed with one or several rinsing liquids. According to the invention, in the treatment process:

a) the rinsing liquid(s), after utilization in the dehydration device, is (are) directed towards the washing tank b) the filtrate originating from the dehydration of the washed residues is directed mainly towards the washing tank, the other part being directed towards the wet purification of the combustion fumes, replacing the make-up water in this purification, or towards a specific treatment unit when the process is not used integrally with a wet purification of the combustion fumes;

c) the distribution of the filtrate originating from the dehydration following b above is controlled so as to maintain a constant level in the washing tank; and d) the composition and the quantity of the, or each, rinsing liquid are chosen as a function of the characteristics of the residues to be treated, so as to rinse the surface of these residues, in particular in order to temporarily solubilize and entrain compounds which are not easily soluble and which are deposited at the surface on the residues to be treated.

DETAILED DESCRIPTION OF THE INVENTION

Figure 1:
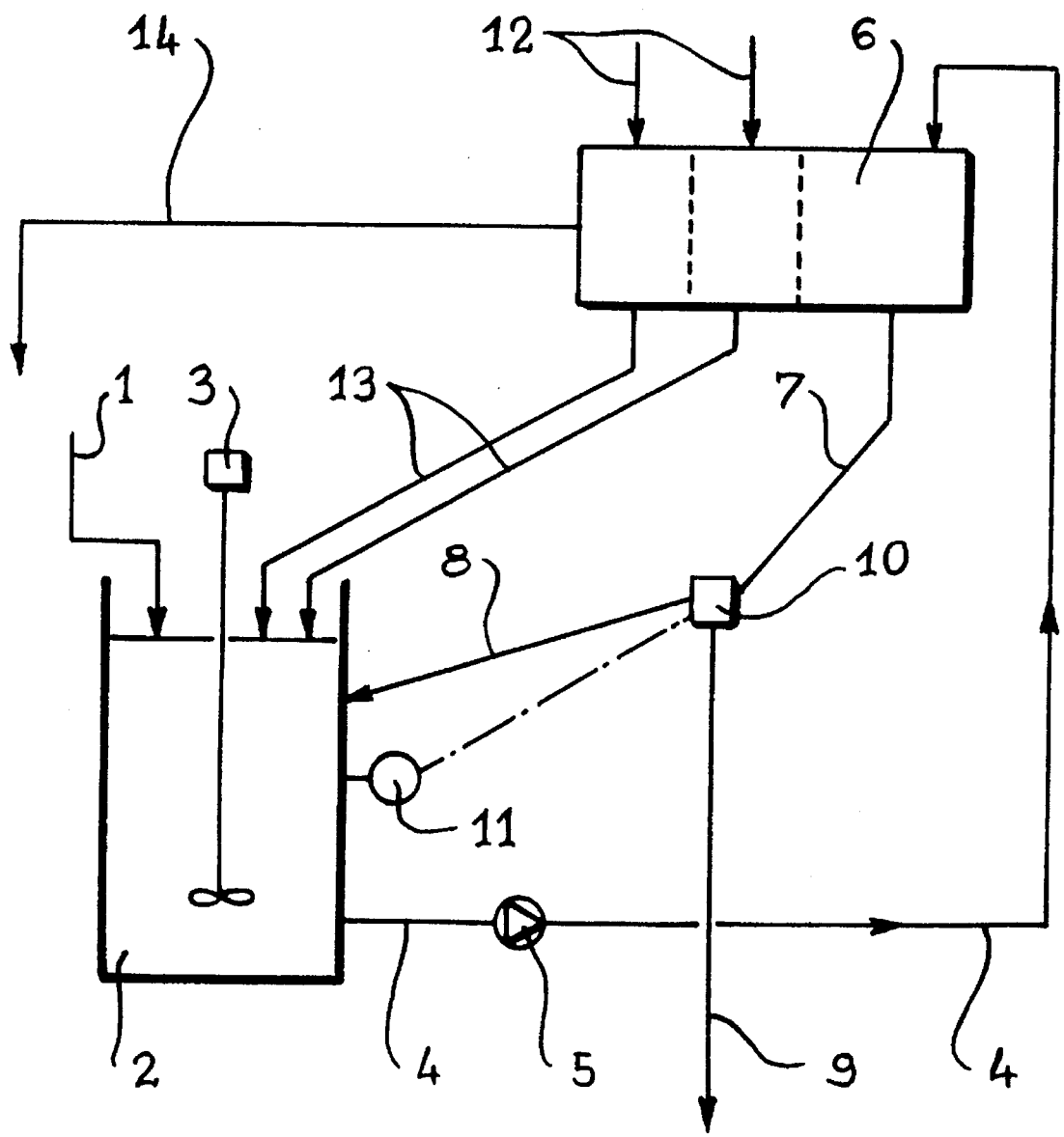
Figure 2:
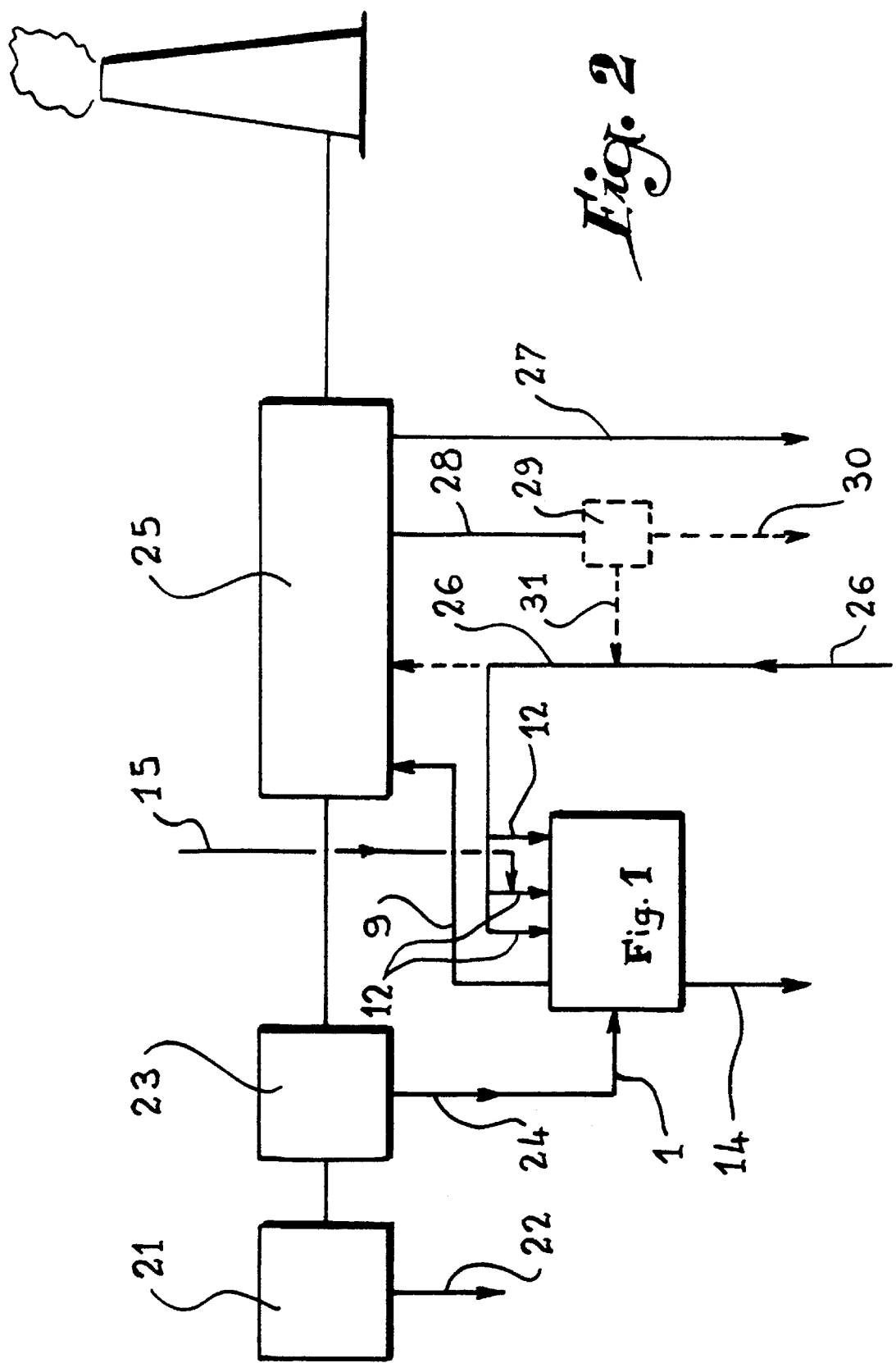

A better understanding of the invention can now be obtained by virtue of the following detailed description in conjunction with FIGS. 1 and 2, which give a diagrammatic illustration of the process forming the subject of the invention.

The residues to be treated (1) are introduced into a washing tank (2) which may be equipped with an agitating device (3) and which contains the washing liquid whose level is measured by a level-measuring device (11). After contact with the washing liquid the washed residues are extracted from the washing tank by a pump (5) conveying a constant flow rate of suspension (liquid+washed residues) (4) to a dehydration device. This suspension is dehydrated in a first part of the dehydration device (6). The resultant filtrate (7) is divided into a main flow (8) directed towards the washing tank (2) and a secondary flow (9). This distribution is performed by a regulator (10) controlled by the signal of the level-measuring device (11) so as to keep the level constant in the washing tank (2). The secondary flow (9) is conveyed into the wet purification of the exhaust (not shown in FIG. 1), replacing all or a part of the make-up water in the fume purification, or towards a specific treatment unit when the process is not used integrally with a wet fume purification. The controller (10) may be a control valve or an overflow device or any other suitable device.

After this dehydration in a first part of the dehydration device (6) the residues are rinsed in one or several separate zones with one or several rinsing liquids (12). All of the filtrate(s) (13) is (are) conveyed into the tank (2). The treated residues (14) are then extracted from the dehydration device (6).

A preferred embodiment of the dehydration device (6) is a drum filter with vacuum filtration, because it allows different dehydration and rinsing zones to be easily determined. However, other devices may be employed, such as, for example, press belt filters.

Surprisingly, this method of washing with a liquid laden with dissolved salts is generally favorable for dissolving trace elements; however, if only this washing with concentrated solution was to be carried out, interstitial water would remain, resulting in a considerable soluble fraction. In the invention the rinsing associated with a low flow rate of make-up water removes this disadvantage.

However, such rinsing with water would remain insufficient—if carried out with a small quantity of water—to dissolve and entrain the compounds that are not easily soluble and are deposited at the surface on the residues to be treated and are present in a quantity which is much greater than that of trace elements. This is the case, for example, with calcium sulfate, which is formed in the combustion by surface sulfation of the fly ash. This is a compound which exhibits an average solubility of approximately 2 g/l, and it must often be removed so as to keep the soluble fraction of the residues low. According to one of the characteristics of the invention, this solubility may be temporarily increased by employing, for example in the second rinsing, an addition (15) of hydrochloric acid, which enables this calcium sulfate to be dissolved not only in the form of $Ca^{++}$ and $SO_4^{--}$ ions (limited by the solubility product of calcium sulfate) but also in the form of $Ca^{++}$ and of $HSO_4^-$ (proportionally greater the lower the pH). This is not possible in a conventional washing without the addition of a very large quantity of acid neutralizing the basic potential of the residues to be treated. According to the invention, this acidic rinsing is carried out as a thin layer in the dehydration device which itself is produced as a thin layer. Such an arrangement then allows the temporary dissolution of the surface calcium sulfate with a low water consumption and a low acid consumption. Depending on the surface characteristics of the residues to be treated, other additives (15) may be added to the water of the second rinsing 12, so as to transfer some compounds present superficially on the residues washed in the rinsing liquid either in the form of dissolved elements or by adsorption precipitation of fine particles in suspension in the rinsing liquid. For example, in the case of the calcium sulfate described above it is possible, usefully in accordance with the invention, to inject into the rinsing liquid a fine calcium carbonate powder which dissolves slowly and allows the dissolved calcium sulfate to precipitate. FIG. 2 shows the implementation of the process in the preferred alternative form which is that of an implementation integral with a wet purification of the combustion fumes. Downstream of the combustion (21) itself (furnace and boiler), where the cinders (22) are recovered, an electrostatic precipitator (23) is often found, ensuring the trapping of the fly ash (24), followed by a wet purification of the fumes (25), the effluent treatment part of which supplies the compounds trapped in the form, on the one hand, of a solid residue (27) (generally called filter cake) and, on the other hand, a clear water (28) containing neutral salts (calcium chloride, sodium chloride etc.). In some cases this clear water is evaporated (29) to produce a salt (30) reusable, for example, in the chemical industry, and water (31) reusable as replacement for the make-up water (26) of the wet purification. According to the invention the cinders (22) (optionally after mechanical treatment, not shown) or the fly ash (24) are conveyed into the washing tank (2) and are subjected to the treatment according to the invention as described in FIG. 1. A part or all of the make-up water (including the water (31) originating from the optional evaporation (29)) is first of all employed for the rinsing(s) (12) and the secondary flow (9) is conveyed as make-up water into the wet purification (25). The design of the wet purification (25) is adapted according to the requirements of the art to the utilization of water laden with compounds in dissolved form and in particulate form.

To make the reading easier, only the treatment in accordance with the invention of the fly ash (24) has been shown in FIG. 2. An identical diagram, not shown, also applies to that of the cinders (22), which may demand a mechanical pretreatment in accordance with the requirements of the art.

It must be understood, furthermore, that the above description has been given merely by way of example and that it does not in any way restrict the field of the invention; it would not constitute a departure therefrom to replace the described details of embodiment with any other equivalents. This is why, insofar as such changes, modifications or rearrangements would be obvious for a person skilled in the art, they are considered as belonging integrally to the present invention.

What is claimed is:

1. A process for the treatment of combustion residues and for the purification of exhaust gases resulting from combustion comprising, separating combustion residues from the exhaust gases;

washing the separated combustion residues with an aqueous liquid containing metals and dissolved salts in an agitated washing tank to form a suspension, initially dehydrating the suspension in a dehydration apparatus to obtain dehydrated residues and a filtrate containing metals and dissolved salts, discharging the filtrate containing dissolved metal salts from the initial dehydration to a control device wherein a first quantity of the filtrate containing metals and dissolved salts is directed into the washing tank, rinsing the dehydrated residues obtained from the initial dehydration using a rinsing liquid to remove soluble elements that remain on the dehydrated residues and thereafter conveying the rinsing liquid to the washing tank, and controlling the control device so that the amount of filtrate containing metals and dissolved salts being directed to the washing tank maintains a generally constant volume of aqueous liquid in the washing tank.

2. The process of claim 1 including adding finely divided solids to the rinsing liquid used to rinse the dehydrated residues.

3. The process of claim 1 including the additional steps of:

wet purification of the exhaust gases after the combustion residues are separated therefrom to obtain solid residues and a liquid containing salts, conveying a second quantity of the filtrate containing metals and dissolved salts and using as make up liquid in the wet purification of the exhaust gases.

4. The process of claim 3 including the additional steps of:

recovering the salts contained in the liquid obtained from the wet purification of the exhaust gases to obtain water, introducing at least a first portion of the water as rinsing liquid for rinsing the dehydrated residues.

5. The process of claim 4 including the additional step of recycling at least a second portion of the water to the wet purification of the exhaust gases.

6. The process of claim 4 including the additional stage of adding hydrochloric acid to the rinsing liquid used to rinse the dehydrated residues.

7. The process of claim 6 including adding a finely divided solid to the rinsing liquid used to rinse the dehydrated residues.

8. The process of claim 3 including the additional stage of adding hydrochloric acid to the rinsing liquid used to rinse the dehydrated residues.

9. The process of claim 8 including adding a finely divided solid to the rinsing liquid used to rinse the dehydrated residues.

10. The process of claim 4 wherein the combustion residues include fly ash obtained by electrostatic precipitate of the exhaust gases prior to the wet purification.

* * * * *